(12) United States Patent
Conti

(10) Patent No.: US 8,307,416 B2
(45) Date of Patent: Nov. 6, 2012

(54) DATA STRUCTURES FOR USE IN FIREWALLS

(75) Inventor: Gregory R. Conti, Saint Paul (FR)

(73) Assignee: Texas Instruments Incorporated, Dallas, TX (US)

( * ) Notice: Subject to any disclaimer, the term of this patent is extended or adjusted under 35 U.S.C. 154(b) by 977 days.

(21) Appl. No.: 11/755,482

(22) Filed: May 30, 2007

(65) Prior Publication Data

US 2008/0163353 A1    Jul. 3, 2008

(30) Foreign Application Priority Data

Jan. 3, 2007    (EP) ..................................... 07290006

(51) Int. Cl.
*G06F 9/00* (2006.01)
*G06F 15/16* (2006.01)
*G06F 17/00* (2006.01)
*G06F 7/04* (2006.01)
*G06F 17/30* (2006.01)
*G06F 12/00* (2006.01)
*G06F 13/00* (2006.01)
*G06F 13/28* (2006.01)

(52) U.S. Cl. .............. 726/11; 726/2; 711/100; 711/154; 711/158

(58) Field of Classification Search .................. 726/2, 3, 726/11; 711/100, 154, 158
See application file for complete search history.

(56) References Cited

U.S. PATENT DOCUMENTS

| | | | | |
|---|---|---|---|---|
| 5,255,367 | A * | 10/1993 | Bruckert et al. ................ 714/11 |
| 7,606,854 | B2 * | 10/2009 | Ellis, III ........................ 709/201 |
| 8,055,886 | B2 * | 11/2011 | Tashiro et al. ................ 712/241 |
| 2003/0131112 | A1 * | 7/2003 | Yu .................................. 709/229 |
| 2003/0140245 | A1 * | 7/2003 | Dahan et al. .................. 713/200 |
| 2005/0021874 | A1 * | 1/2005 | Georgiou et al. ............. 709/250 |
| 2005/0154869 | A1 * | 7/2005 | Shaw et al. ....................... 713/1 |
| 2005/0285623 | A1 * | 12/2005 | Jahan et al. ..................... 326/68 |
| 2008/0052532 | A1 * | 2/2008 | Akkar et al. .................. 713/189 |

FOREIGN PATENT DOCUMENTS

| | | |
|---|---|---|
| EP | 1 619 572 A | 1/2006 |
| EP | 1 742 152 A | 1/2007 |

* cited by examiner

*Primary Examiner* — Edan Orgad
*Assistant Examiner* — Jahangir Kabir
(74) *Attorney, Agent, or Firm* — Ronald O. Neerings; Wade James Brady, III; Frederick J. Telecky, Jr.

(57) ABSTRACT

A system-on-chip (SOC) that includes a plurality of initiator components, and a target memory component coupled to the initiator components and having a target firewall, wherein the target firewall is configured to be programmed with a data structure which indicates, for at least one portion of the target memory component, access conditions for each initiator component.

15 Claims, 6 Drawing Sheets

DATA STRUCTURES FOR USE IN FIREWALLS

CROSS-REFERENCE TO RELATED APPLICATION

The present Application claims priority to EP Application No. 07290006.1, filed on Jan. 3, 2007, hereby incorporated herein by reference.

BACKGROUND

Mobile electronic devices such as personal digital assistants (PDAs) and digital cellular telephones are increasingly used for electronic commerce (e-commerce) and mobile commerce (m-commerce). It is desired for the programs that execute on the mobile devices to implement the e-commerce and m-commerce functionality in a secure mode to reduce the likelihood of attacks by malicious programs and to protect sensitive data.

For security reasons, most processors provide two levels of operating privilege: a lower level of privilege for user programs; and a higher level of privilege for use by the operating system. The higher level of privilege may or may not provide adequate security for m-commerce and e-commerce, however, given that this higher level relies on proper operation of operating systems with vulnerabilities that may be publicized. In order to address security concerns, some mobile equipment manufacturers implement a third level of privilege, or secure mode, that places less reliance on corruptible operating system programs, and more reliance on hardware-based monitoring and control of the secure mode. U.S. Patent Publication No. 2003/0140245, entitled "Secure Mode for Processors Supporting MMU and Interrupts," incorporated herein by reference, describes a hardware-monitored secure mode for processors. There exists a need for methods and related systems to eliminate the potential for malicious software to manipulate the system into entering a secure mode and executing non-secure instructions.

BRIEF SUMMARY

Disclosed herein are techniques for verifying the integrity of a secure mode (e.g., monitor mode) of a system. An illustrative embodiment is a system-on-chip (SOC) that includes a plurality of initiator components, and a target memory component coupled to the initiator components and having a target firewall, wherein the target firewall is configured to be programmed with a data structure which indicates, for at least one portion of the target memory component, access conditions for each initiator component.

Another embodiment includes a method for providing security in a system-on-chip (SOC) that includes a plurality of initiator components and a plurality of target memory components, the method including programming a target firewall with a data structure which indicates, for at least one portion of a target memory component coupled to the target firewall, access conditions for each initiator component of the SOC, receiving a signal by the target firewall requesting access to the at least one portion of the target memory component, the signal comprising qualifiers of an initiator component, and comparing, by the target firewall, the qualifiers with the access conditions for the initiator component and, as a result of the comparison, preventing the requested access.

Yet another embodiment is a system-on-chip (SOC) that includes a plurality of initiator components, a plurality of target memory components coupled to the plurality of initiator components, each target memory component having a target firewall, wherein each target firewall is configured to be programmed with a first data structure indicating access conditions for each initiator component to access the corresponding target memory component, and a system security controller coupled to the target firewalls and configured to take protective action when signaled by a target firewall, wherein each target firewall is configured to signal the system security controller to take protective action if an initiator component attempts to access the target memory component without meeting an access condition for the initiator component indicated in the first data structure.

Notation and Nomenclature

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
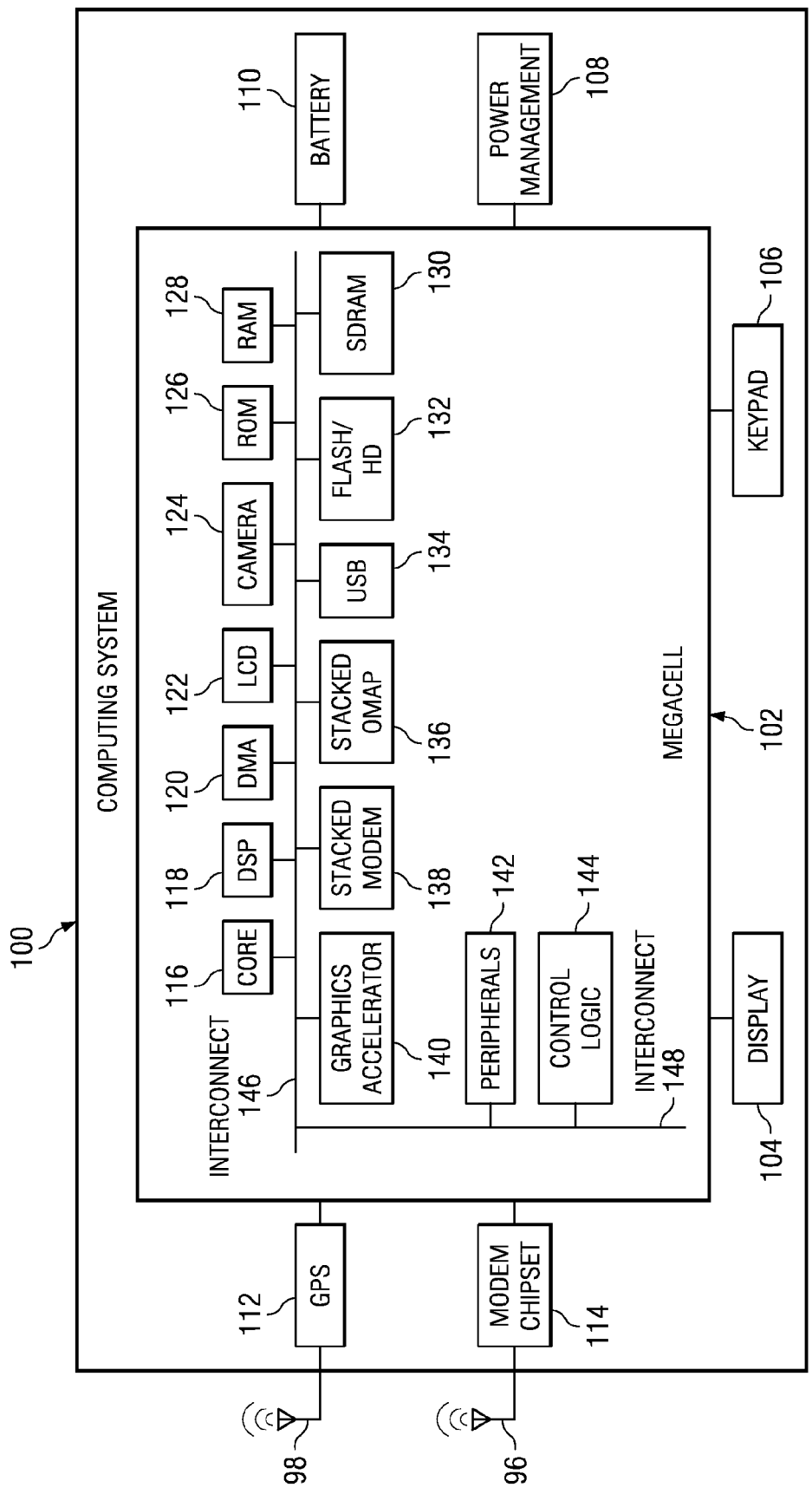
FIG. 1 shows a computing system constructed in accordance with at least some embodiments of the invention.

FIG. 1 shows a computing system 100 in accordance with at least some embodiments of the invention. The computing system 100 preferably comprises the ARM® TrustZone® architecture, but the scope of disclosure is not limited to any specific architecture. The computing system 100 contains a megacell 102 which comprises a processor core 116 (e.g., an ARM core) and a digital signal processor (DSP) 118 which aids the core 116 by performing task-specific computations, such as graphics manipulation and speech processing. The megacell 102 also comprises a direct memory access (DMA) 120 which facilitates direct access to memory in the megacell 102. The megacell 102 further comprises a liquid crystal display (LCD) logic 122, a camera logic 124, read-only memory (ROM) 126, random-access memory (RAM) 128, synchronous dynamic RAM (SDRAM) 130 and storage (e.g., flash memory or hard drive) 132. The megacell 102 may comprise a universal serial bus (USB) logic 134 which enables the system 100 to couple to and communicate with external devices. The megacell 102 also comprises stacked open multimedia application platform (OMAP) logic 136, stacked modem logic 138, and graphics accelerator 140 all coupled to each other via an interconnect 146. The graphics accelerator 140 performs necessary computations and translations of information to allow display of information, such as on display 104. Interconnect 146 couples to interconnect 148, which couples to peripherals 142 (e.g., timers, universal asynchronous receiver transmitters (UARTs)) and to control logic 144.

In accordance with at least some embodiments of the invention, the computing system 100 may be a mobile (e.g., wireless) computing system such as a cellular telephone, personal digital assistant (PDA), text messaging system, and/or a computing device that combines the functionality of a messaging system, PDA and a cellular telephone. Thus, some embodiments may comprise a modem chipset 114 coupled to an external antenna 96 and/or a global positioning system (GPS) logic 112 likewise coupled to an external antenna 98.

The megacell 102 further couples to a battery 110 which provides power to the various processing elements. The battery 110 may be under the control of a power management unit 108. A user may input data and/or messages into the computer system 100 by way of the keypad 106. Because many cellular telephones also comprise the capability of taking digital still and video pictures, in some embodiments, the computer system 100 may comprise a camera interface 124 which may enable camera functionality, possibly by coupling the computing system 100 to a charge couple device (CCD) array (not shown) for capturing digital images.

Much of the discussion herein is provided in the context of a mobile computing system 100. However, the discussion of the various systems and methods in relation to a mobile computing environment should not be construed as a limitation as to the applicability of the systems and methods described herein to just mobile computing environments.

In accordance with at least some embodiments of the invention, many of the components illustrated in FIG. 1, while possibly available as individual integrated circuits, preferably are integrated or constructed onto a single semiconductor die. Thus, the core 116, the DSP 118, DMA 120, camera interface 124, ROM 126, RAM 128, SDRAM 130, storage 132, USB logic 134, stacked OMAP 136, stacked modem 138, graphics accelerator 140, control logic 144, along with some or all of the remaining components, preferably are integrated onto a single die, and thus may be integrated into a computing device 100 as a single packaged component. Having multiple devices integrated onto a single die, especially devices comprising core 116 and RAM 128, may be referred to as a system-on-chip (SoC) or a megacell 102. While using a SoC is preferred, obtaining benefits of the systems and methods as described herein does not require the use of a SoC.

Figure 2:
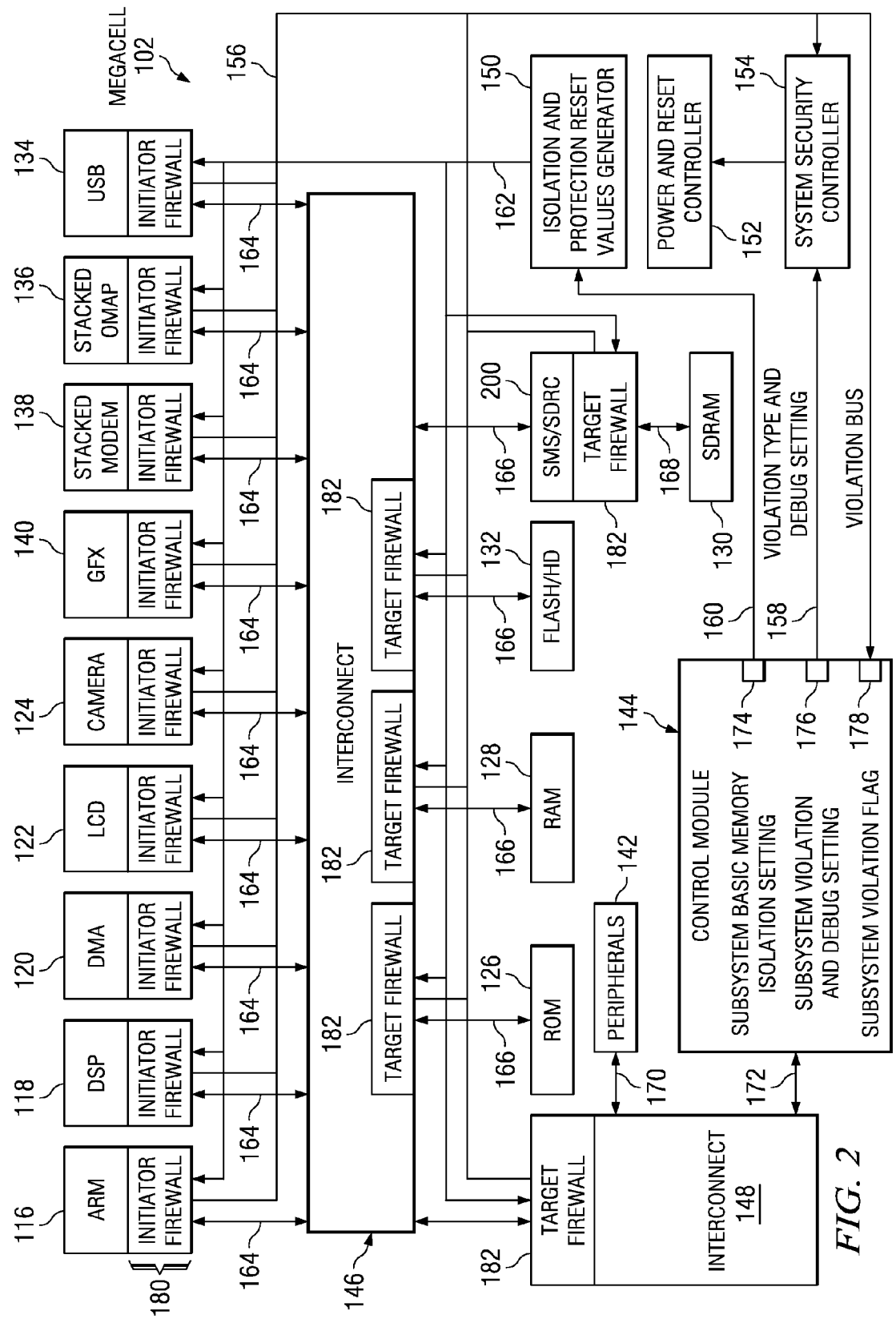
FIG. 2 shows a detailed view of the system of FIG. 1, in accordance with preferred embodiments of the invention.

FIG. 2 shows an embodiment of the megacell 102 in detail. Each of the components described in FIG. 1 is shown coupled to other components via interconnects 146 and 148. The synchronous dynamic random access memory (SDRAM) 130 couples to the interconnect 146 via SDRAM memory scheduler (SMS) logic 200. Most or all of the components described in FIG. 1 are associated with firewalls, as shown in FIG. 2. In particular, the core 116, DSP 118, DMA 120, LCD 122, camera 124, graphics accelerator 140, stacked modem 138, stacked OMAP 136, and USB 134 are known as "initiators," and each initiator is associated with a different initiator firewall 180. Similarly, the peripherals 142, control module 144, ROM 126, RAM 128, storage 132 and SMS 200 are known as "targets" and are associated with different target firewalls 182. The initiator firewalls 180 and target firewalls 182 are used for security purposes as described below. The megacell 102 comprises additional safety components, such as a system security controller 154, a power and reset controller 152, and a firewall value generator 154, also described below.

Some or all of the control module 144, the initiator firewalls 180, the target firewalls 182, the system security controller 154, the power and reset controller 152 and the firewall value generator 154 form the security infrastructure for the computer system 100. In accordance with preferred embodiments, the control module 144 has three ports 174, 176 and 178 through which the control module 144 interacts with the remaining components of the security infrastructure. Port 174 couples with the firewall value generator 154 via bus 160. Port 176 couples with the system security controller 154 via bus 158. Port 178 couples to each of the initiator firewalls 180 and each of the target firewalls 182 via bus 156.

The system 100 is capable of operating within a variety of different system (e.g., security) modes. The system modes of the system 100 are established to protect system memories and other system components from attack. Specifically, each of the memories (e.g., ROM 126, RAM 128, SDRAM 130) is partitioned into public and secure domains. The public domain is accessible in a non-secure mode and the secure domain is accessible only in a secure mode. In at least some embodiments, the public and secure domain partitions are virtual (i.e., non-physical) partitions generated and enforced by a memory management unit (not specifically shown).

Figure 3A:
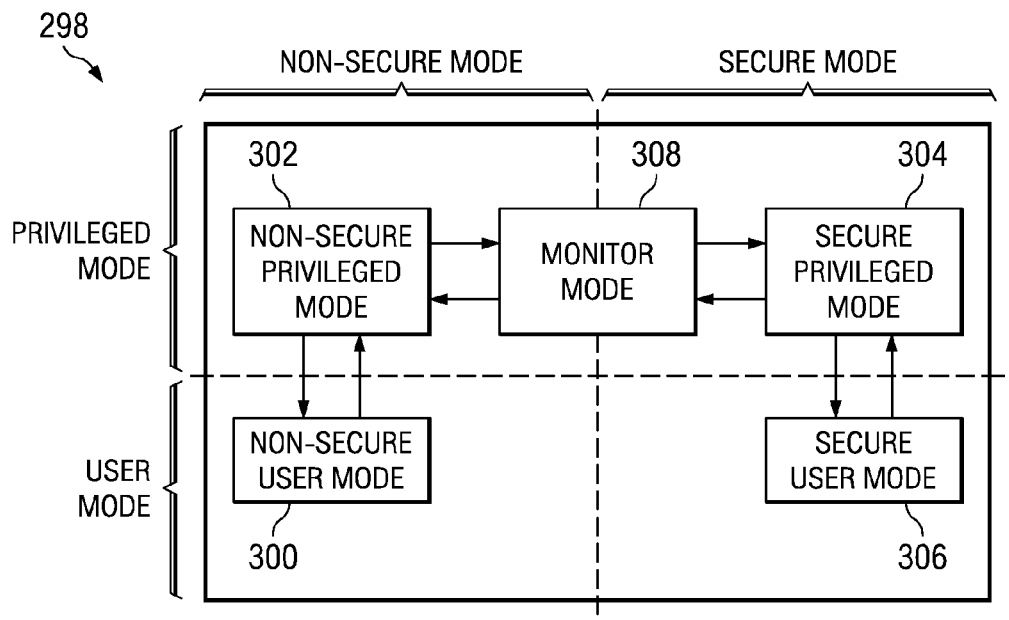
FIGS. 3a and 3b show block diagrams of various security levels associated with the system of FIGS. 1 and 2, in accordance with embodiments of the invention.

Each of the secure and non-secure modes may be partitioned into "user" and "privileged" modes. Programs that interact directly with an end-user, such as a web browser, are executed in the user mode. Programs that do not directly interact with an end-user, such as the operating system (OS), are executed in the privileged mode. By partitioning the secure and non-secure modes in this fashion, a total of four security modes are available. As shown in FIG. 3a, in order of ascending security level, these four modes include the non-secure user mode 300, the non-secure privileged mode 302, the secure user mode 304, and the secure privileged mode 306. There is an additional security mode, called the monitor mode 308, between the modes 302 and 304. The system 100 may operate in any one of these five modes at a time.

The system 100 may switch from one mode to another. FIG. 3a illustrates a preferred mode-switching sequence 298. The sequence 298 is preferred because it is more secure than other possible switching sequences. For example, to switch from the non-secure user mode 300 to the secure privileged mode 304, the system 100 should first pass through non-secure privileged mode 302 and the monitor mode 308. Likewise, to pass from the secure user mode 306 to the non-secure user mode 300, the system 100 should switch from the secure user mode 306 to the secure privileged mode 304, from the secure privileged mode 304 to the monitor mode 308, from the monitor mode 308 to the non-secure privileged mode 302, and from the non-secure privileged mode 302 to the non-secure user mode 300.

Figure 3B:
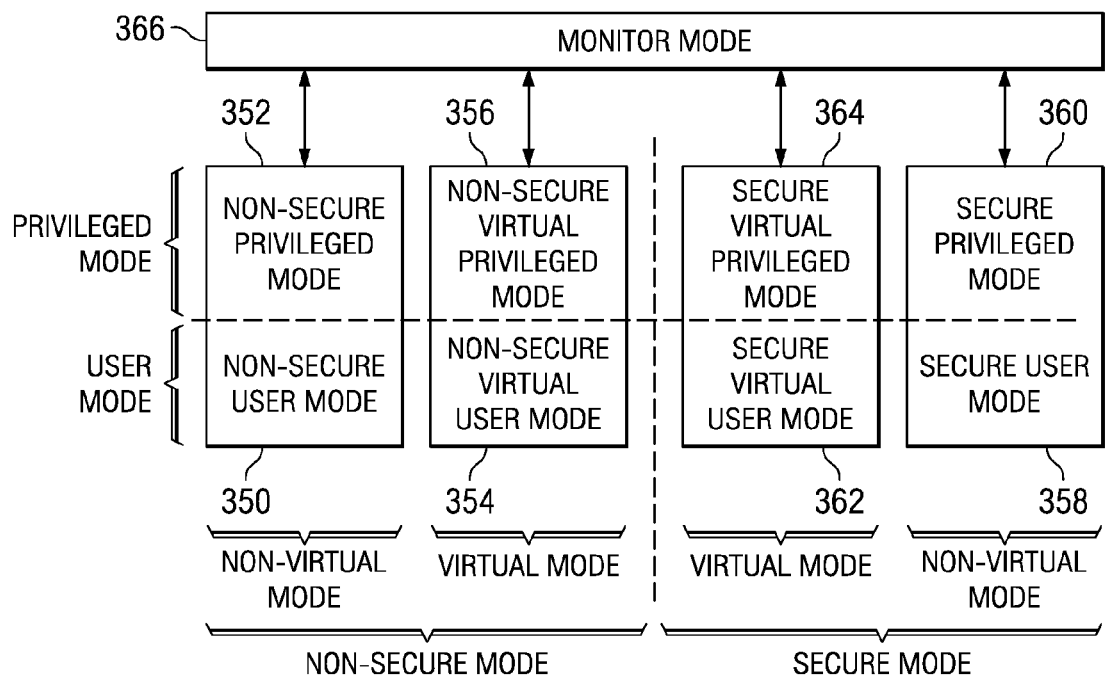

Some embodiments contain additional modes besides the five modes (including monitor mode) shown in FIG. 3a. Specifically, the scope of this disclosure includes a virtual non-secure mode and a virtual secure mode. In turn, each of these virtual modes includes a virtual user mode and a virtual privileged mode. Thus, as shown in FIG. 3b, in some embodiments, a total of nine modes may be possible: a non-secure user mode 350, a non-secure privileged mode 352, a non-secure virtual user mode 354, a non-secure virtual privileged mode 356, a secure user mode 358, a secure privileged mode 360, a secure virtual user mode 362, a secure virtual privileged mode 364, and a monitor mode 366. A detailed description of virtual modes is available in the patent application filed Feb. 6, 2007, having attorney docket number T1-61985, entitled, "Virtual Cores And Hardware-Supported Hypervisor Integrated Circuits, Systems, Methods And Processes Of Manufacture," and incorporated herein by reference.

As explained above, the system security infrastructure comprises a plurality of initiator and target firewalls. Each of the initiator firewalls 180 monitors various accesses (e.g., memory accesses, data/instruction accesses, register accesses) initiated by an associated component (e.g., by the ARM 116, DSP 118). If an initiator firewall 180 detects an illegal access attempt, the firewall 180 sends a signal to the control module 144, which logs the illegal access attempt (e.g., in a firewall status data structure), and also to the system security controller 154, which takes protective action. For example, the DSP 118 is associated with an initiator firewall 180. If the DSP 118 attempts to access a portion of the ROM 126 which the DSP 118 is not allowed to access, the initiator firewall 180 associated with the DSP 118 generates an alert signal and sends the signal to the control module 144, which logs the illegal access attempt, and to the controller 154, which takes protective action as described in the commonly-assigned U.S. patent application Ser. No. 10/961,748, incorporated herein by reference. In this way, the initiator firewall protects its initiator from the consequences of illegal accesses originating from that initiator. The initiator firewall determines whether an access attempt is legal or illegal as described further below.

Similarly, each of the target firewalls 182 monitors accesses to components (e.g., storage such as ROM 126) associated with that firewall. If a target firewall 182 determines that its component is being accessed by a particular initiator which is allowed to access that storage in the current system 100 system mode, the target firewall 182 permits access to the storage with which it is associated. If the target firewall 182 detects an illegal storage access attempt, the firewall 182 sends a response signal to the circuit logic attempting the access, indicating that the access attempt is illegal. The firewall 182 also sends a signal to the control module 144, thus enabling the control module 144 to log the illegal access attempt. The firewall 182 further sends a signal to the system security controller 154, which takes protective action. For example, the ROM 126 is associated with a target firewall 182. If the core 116 attempts to illegally access a portion of the ROM 126, the target firewall 182 associated with the ROM 126 informs the core 116 that the access attempt is illegal, informs the control module 144 of the illegal access attempt so that the control module 144 may log the illegal attempt, and further informs the system security controller 154, which takes action to prevent compromise of security. In this way, the target firewall protects the component with which it is associated.

When the system security controller 154 receives a security violation signal, the system security controller 154 determines the type of violation that has occurred. Based on this determination, and further based on security violation reporting strategy information provided by the control module 144 on bus 158 in response to a violation notice provided on bus 156, the system security controller 154 may cause the power and reset controller 152 to take protective action such that the detected attack is foiled. Any suitable protective action may be taken, such as resetting some or all of the circuit logic of the megacell 102, forcing one or more components of the megacell 102 to be powered off, etc. The control module 144, the system security controller 154 and the power and reset controller 152 together may implement any of a variety of protective security measures (e.g., resetting the system 100), many of which are described in the commonly owned patent application entitled, "System and Method of Identifying and Preventing Security Violations Within a Computing System," U.S. patent application Ser. No. 10/961,748, incorporated herein by reference. The control module 144 also has the capability to adjust the parameters in one or more firewalls using the firewall value generator 150 and bus 162, thereby adjusting the conditions under which the firewalls send alert signals to the control module 144.

Each of the initiator and target firewalls is programmed with security information usable to determine whether an access attempt is legal or illegal. As described below, each firewall is programmed (e.g., with a data structure) indicating various requirements an access attempt must satisfy before access is granted. In order for a firewall to determine whether an access request complies with the requirements programmed into that firewall, each access request comprises a plurality of qualifiers, also described below, which indicate various attributes associated with the request. Such attributes include the component (e.g., the stacked modem 138) which initiated the access request, whether the request is for data or for an instruction, etc. Each firewall compares one or more qualifiers of an access request with the requirements programmed into that firewall. If the qualifiers meet the requirements, the firewall may grant the access request. If the qualifiers fail to meet the requirements, the firewall may deny the access request.

Figure 4:
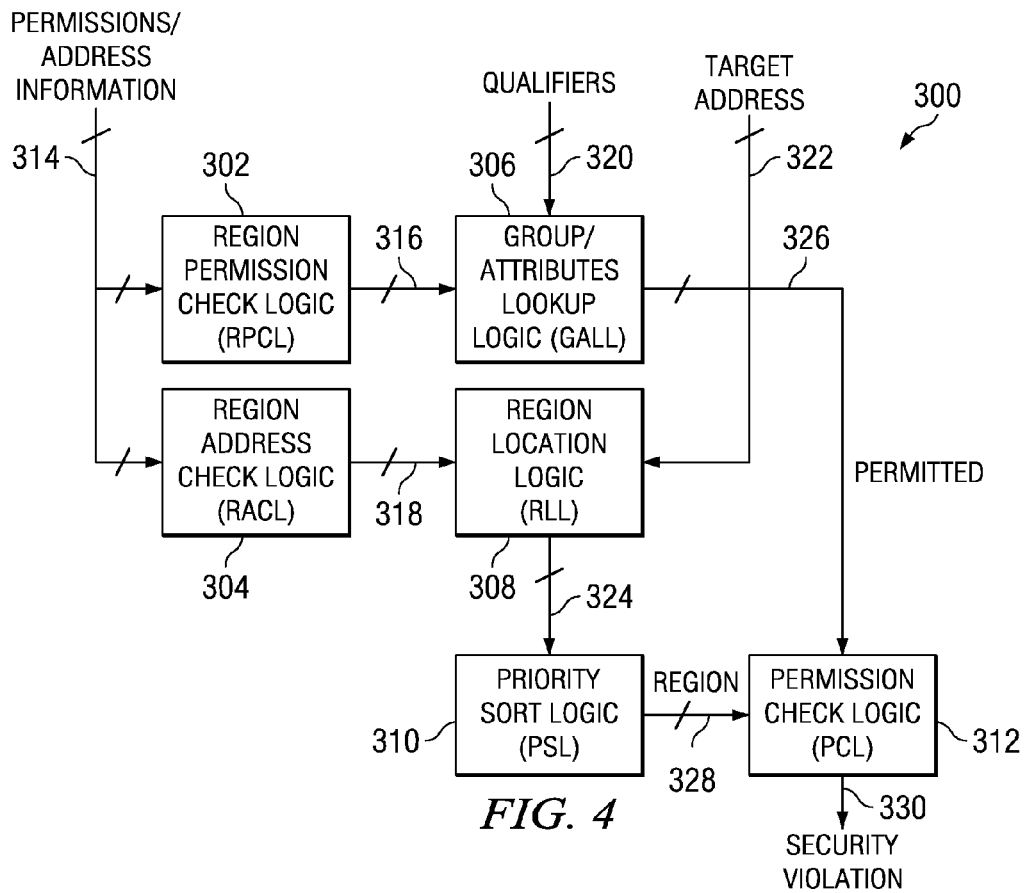
FIG. 4 shows a block diagram of a firewall used in the system of FIGS. 1 and 2, in accordance with preferred embodiments of the invention.

FIG. 4 shows an illustrative firewall 300. The firewall 300 is representative of at least some of the initiator firewalls 180 and target firewalls 182. The firewall 300 comprises a region permission check logic (RPCL) 302, a region address check logic (RACL) 304, a group/attributes lookup logic (GALL) 306, a region location logic (RLL) 308, a priority sort logic (PSL) 310 and a permission check logic (PCL) 312.

The RPCL 302 and the RACL 304 are programmed with permissions and address information (e.g., in the form of data structures such as data structure(s) 500, described below) by, for example, a manufacturer or end-user. This information indicates which initiators are allowed to access which portions/regions of which storages. The RPCL 302 provides region permission information to the GALL 306 via bus 316, and the RACL 304 provides region address permission information to the RLL 308 via bus 318.

The GALL 306 receives the qualifiers described above via bus 320. In turn, the GALL 306 uses the region permission information received via bus 316 to determine which regions of storage may be accessed, based on the qualifiers provided via bus 320. Qualifiers are generated by one or more initiators. The GALL 306 may determine one or more regions of storage which are accessible by an initiator having attributes reflected by the qualifiers. The GALL 306 provides this region information to the PCL via bus 326.

The RLL 308 receives a target address, described above, via bus 322. The RLL 308 determines which regions have addresses that correspond to the target address. In at least some cases, more than one region may correspond to a single target address. The RLL 308 provides this region information to the PSL 310 via bus 324.

The PSL 310 receives the region information from the RLL 308 and sorts the regions in any desirable arrangement. The PSL 310 may be pre-programmed to sort the regions into various such arrangements. In preferred embodiments, the PSL 310 sorts the regions in descending order of address range and provides this region information to PCL 312 via bus 328.

The PCL 312 uses region information received via buses 326 and 328 to determine, based on the qualifiers on bus 320 and target address on bus 322, which portions/regions of storage are accessible by an initiator issuing the qualifiers and the target address. For each region, the PCL 312 outputs security violation information on bus 330, indicating whether the region is accessible by the initiator. Although information received by the PCL 312 may be used in any suitable way to determine which regions are accessible, in preferred embodiments, the PCL 312 determines which regions are indicated as accessible by both the logic 306 and the logic 308. In this way, access to one or more regions of storage may be granted or refused to an initiator. Each initiator and target firewall functions in this way or in a similar way.

As described above, a firewall determines whether an access is legal using identifying information received from an initiator. This identifying information comprises a plurality of qualifiers. Each qualifier indicates some information associated with the corresponding initiator (e.g., a status of the qualifier at the time a request was sent to a target firewall). Illustrative qualifiers include the MReqSecure, MReqDebug, MReqType, MReqSupervisor, MReqSystem, MCMD and ConnID qualifiers. Each of these qualifiers is now described in turn. The MReqSecure qualifier indicates whether the initiator, at the time the initiator issued a request to access a memory associated with the target firewall, was in a secure mode or in a non-secure (e.g., public) mode. For example, the MReqSecure qualifier may comprise a single bit, where a "0" bit indicates that the initiator was in a secure mode and a "1" bit indicates that the initiator was in a non-secure mode, or vice versa. The MReqDebug qualifier indicates whether the initiator, at the time the request was issued, was in a debug (e.g., test) mode or in a functional mode. The MReqType qualifier indicates whether the request is a request for data or for an instruction. The MReqSupervisor indicates whether the initiator, at the time the request was issued, was in a user mode or in a privilege mode. The MReqSystem qualifier indicates whether the initiator, at the time the request was issued, was in a virtual mode or in a non-virtual mode. The MCMD qualifier indicates whether the request is a read request or a write request. The ConnID qualifier comprises information identifying the initiator making the request.

As explained, the qualifiers generated by an initiator are used by both initiator and target firewalls to determine whether accesses are legal. Specifically, each firewall compares qualifiers of an access request with security requirements programmed into that firewall. If the qualifiers match the security requirements, the access request is granted. If the qualifiers fail to match the security requirements, the access request is denied. An illustrative technique by which the firewalls are programmed with security requirements is now described.

In some embodiments, the core 116 is the master initiator and the other initiators are slave initiators. As such, the core 116 programs each firewall with the appropriate security rules for that firewall. For example, referring to FIG. 2, the core 116 may program the firewall 182 associated with ROM 126 to allow only the core 116 to access the ROM 126. Similarly, the core 116 may program the firewall 182 to allow the core 116 to access one portion of the ROM 126 and to allow the DSP 118 to access another portion of the ROM 126. In some cases, the core 116 may optionally program memory management units (MMUs) of the slave initiators in a similar fashion.

Figure 5:
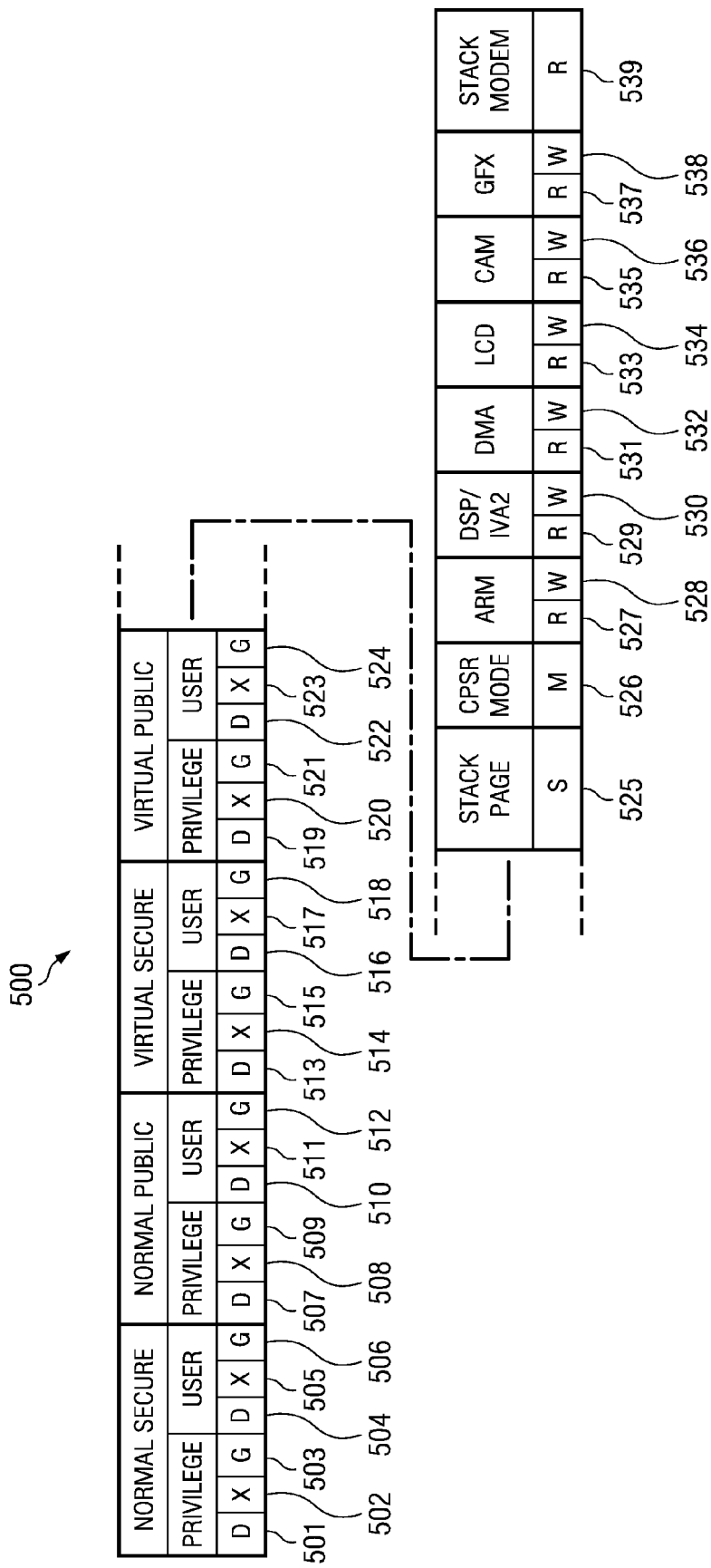
FIG. 5 shows an illustrative data structure used to program security information into the firewall of FIG. 4, in accordance with preferred embodiments of the invention.

The core 116 programs the firewalls (and, optionally, the MMUs) in accordance with one or more data structures stored on the core 116. FIG. 5 shows an illustrative data structure 500 used by the core 116 to program a firewall, although additional data structures also may be used in conjunction with the data structure 500. When programmed into the target firewall of a memory (e.g., firewall 182 of ROM 126), the data structure 500 is paired with a portion of that memory and dictates the conditions under which that portion of memory may be legally accessed. For example, the core 116 may program a data structure 500 into the firewall 182 associated with the ROM 126. The firewall 182 may pair the data structure 500 with a specific portion of the ROM 126. Whenever an initiator attempts to access that portion of the ROM 126, the firewall 182 uses the data structure 500 to determine whether the conditions specified in the data structure 500 have been satisfied (i.e., whether the access attempt is legal). If the access attempt is illegal, the firewall generates a violation signal which is sent to the control module 144 for processing.

Similarly, for example, the data structure 500 may be used by the core 116 to program an initiator firewall, such as the initiator firewall of the DSP 118. This initiator firewall may be programmed with specific attributes which limit the storages (e.g., ROM 126) or portions of storages which the DSP 118 may legally access. Other data structures besides the data structure 500 may be used in programming the DSP 118. If the firewall 180 is programmed to prevent the DSP 118 from accessing any storage component besides the ROM 126, the firewall 180 will block attempts by the DSP 118 to access, for example, the ROM 128. The firewall 180 determines which access attempts to block and which attempts to allow by comparing the programmed information (e.g., using various data structures such as data structure 500) to qualifiers generated by the DSP 118.

The data structure 500 comprises a plurality of fields 501-539. Fields 501-503 indicate whether data accesses, instruction executions, and debug executions may be performed using the storage (e.g., one or more portions of the ROM 126, RAM 128, etc.) associated with the data structure 500 when the system 100 is in secure privilege mode. Fields 504-506 indicate whether data accesses, instruction executions, and debug executions may be performed using the storage associated with the data structure 500 when the system 100 is in secure user mode. Fields 507-509 indicate whether data accesses, instruction executions, and debug executions may be performed using the storage associated with the data structure 500 when the system 100 is in non-secure (i.e., public) privilege mode. Fields 510-512 indicate whether data accesses, instruction executions, and debug executions may be performed using the storage associated with the data structure 500 when the system 100 is in non-secure user mode.

Fields 513-515 indicate whether data accesses, instruction executions, and debug executions may be performed using the storage associated with the data structure 500 when the system 100 is in secure, virtual, privilege mode. Fields 516-518 indicate whether data accesses, instruction executions, and debug executions may be performed using the storage associated with the data structure 500 when the system 100 is in secure, virtual, user mode. Fields 519-521 indicate whether data accesses, instruction executions, and debug executions may be performed using the storage associated with the data structure 500 when the system 100 is in non-secure (i.e., public), virtual, privilege mode. Fields 522-524 indicate whether data accesses, instruction executions, and debug executions may be performed using the storage associated with the data structure 500 when the system 100 is in non-secure, virtual, user mode.

Field 525 indicates whether the data structure 500 is associated with storage that is used as a processor stack. Field 526 indicates the mode in which the system 100 must be in order for the storage associated with the data structure 500 to be accessed. For example, if field 526 comprises bits which are associated with the monitor mode, and if the system 100 is not in monitor mode when the storage associated with the data structure 500 is accessed, a security violation signal is generated and sent to the control module 144. Fields 527 and 528 are "read" and "write" fields associated with the core 116, respectively. Specifically, field 527 indicates whether the core 116 is permitted to read from the memory space associated with the data structure 500, and field 528 indicates whether the storage 116 is permitted to write to the storage space associated with the data structure 500.

Similarly, fields 529 and 530 are "read" and "write" fields associated with the DSP 118. Field 529 indicates whether the DSP 118 is permitted to read from the storage space associated with the data structure 500, and field 530 indicates whether the DSP 118 is permitted to write to the storage space associated with the data structure 500. Likewise, fields 531-532, 533-534, 535-536 and 537-538 are "read" and "write" fields for the DMA 120, LCD 122, camera 124 and GFX 140, respectively. Field 539 comprises a "read" field for the stack modem 138. The core 116 uses at least some of these fields to program each target firewall 182. As mentioned, the core 116 may use similar techniques to program the initiator firewalls and, in some embodiments, MMUs associated with the initiators. In at least some embodiments, modified versions of the data structure 500 are used to program initiator firewalls.

Figure 6A:
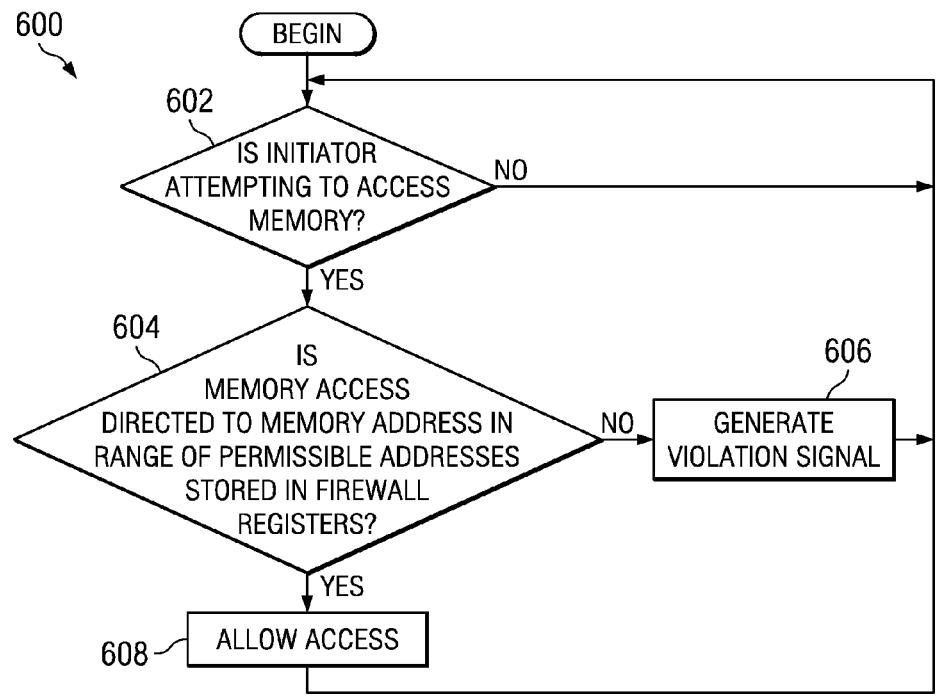
FIGS. 6A and 6B show flow diagrams of methods associated with the firewalls shown in FIG. 2, in accordance with embodiments of the invention.

FIG. 6A shows an illustrative method 600 implemented by initiator firewalls to protect the system 100 from attack. The method 600 begins by determining whether an initiator associated with the initiator firewall is attempting to access memory (block 602). If the initiator is attempting to access memory, the method 600 continues by determining whether the memory access is directed to a memory address that falls within a range of permissible addresses stored in the firewall's registers (block 604). If the memory access falls outside this range, the method 600 comprises generating a violation signal (block 606). Otherwise, the firewall allows the initiator to access the memory (block 608). The method 600 may be implemented in embodiments where the initiator firewalls are programmed with address information. Other such methods may be used, depending on the type of information programmed into the initiator firewalls.

Figure 6B:
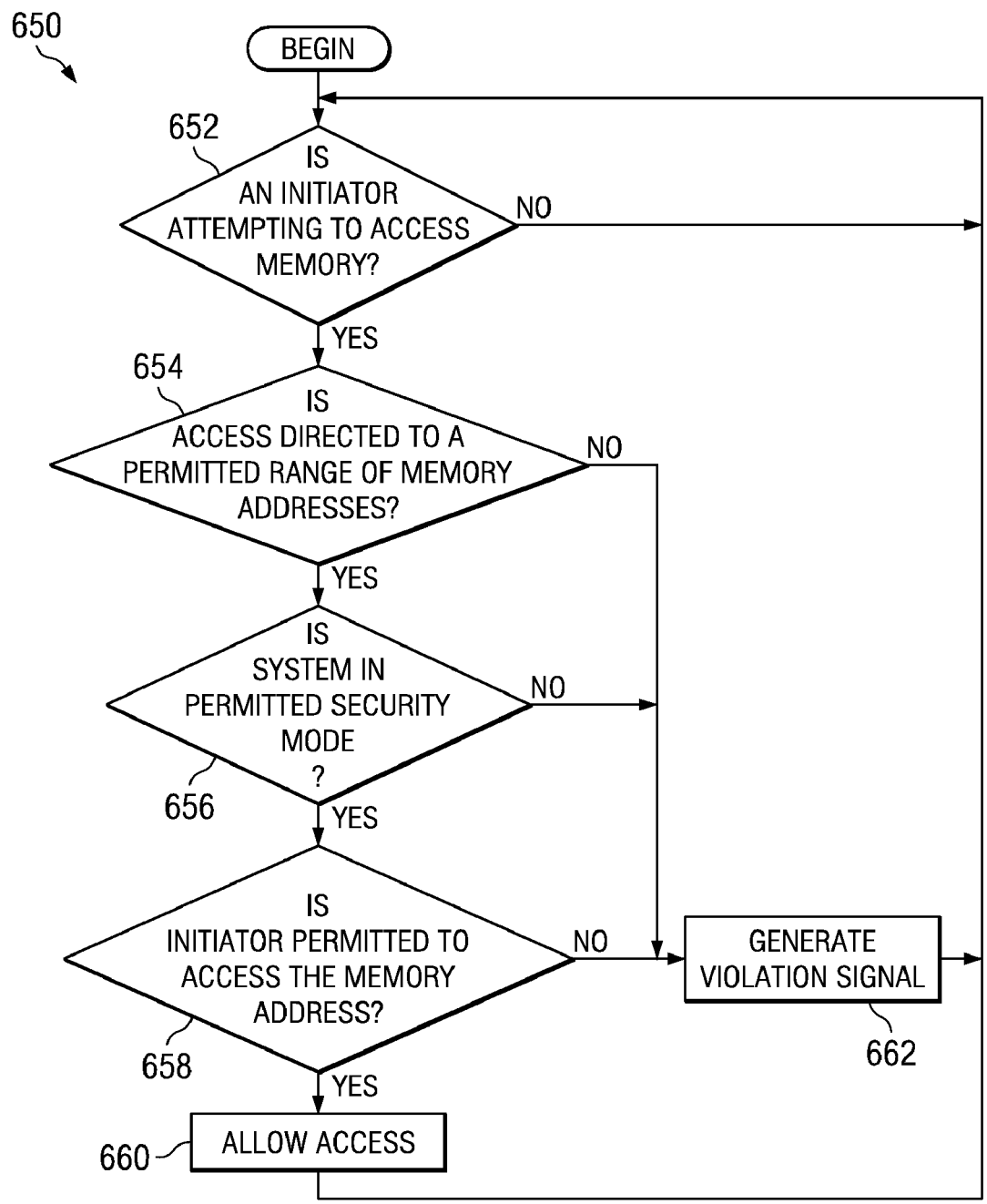

FIG. 6B shows an illustrative method 650 implemented by target firewalls to protect the system 100 from attack. The method 650 begins by determining whether an initiator is attempting to access the memory associated with the target firewall (block 652). If so, the method 650 further comprises determining whether the access is directed to a permitted range of memory addresses (block 654). If not, the method 650 comprises generating a violation signal (block 662). Otherwise, the method 650 comprises determining whether the system is in a permitted security mode (block 656). If not, the method 650 comprises generating a violation signal (block 662). Otherwise, the method 650 comprises determining whether the initiator is permitted to access the memory address (block 658) If not, the method 650 comprises generating a violation signal (block 662). Otherwise, the method 650 comprises allowing the access (block 660). The method 650 may be implemented in embodiments where the target firewalls are programmed with address information. Other such methods may be used, depending on the type of information programmed into the target firewalls.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system-on-chip (SOC) comprising:
    a processing core configured to operate as a master initiator;
    a plurality of slave initiator components coupled to the processing core, each slave initiator having an initiator firewall comprising programmable region permission check logic;
    a first target memory component coupled to the slave initiator components and the processing core and having a first target firewall comprising programmable region permission check logic;
    a second target memory component coupled to the slave initiator components and the processing core and having a second target firewall comprising programmable region permission check logic; and
    a memory coupled to the processing core and configured to store a first data structure and a second data structure, the first data structure indicating for at least one portion of the first target memory component, distinct access conditions for each slave initiator component and the master initiator and access conditions applicable to all slave initiator components and the second data structure indicating for at least one portion of the second target memory component, distinct access conditions for each slave initiator component and the master initiator and access conditions applicable to all slave initiator components and the master initiator,
    wherein the processing core programs the region permission check logic of the first target firewall and each slave initiator firewall according to the distinct access conditions and the access conditions applicable to all slave initiator components indicated in the first data structure and the region permission check logic of the second target firewall and each slave initiator firewall according to the distinct access conditions and the access conditions applicable to all slave initiator components indicated in the second data structure.

2. The SOC of claim 1, wherein the first target firewall is configured to initiate protective action to prevent a slave initiator component from accessing the at least one portion of the first target memory component if a slave initiator component attempts to access the at least one portion of the first target memory component without meeting an access condition indicated in the first data structure.

3. The SOC of claim 1, wherein each slave initiator component is configured to access the first target memory component by issuing a request comprising qualifiers, and wherein the qualifiers indicate a security mode associated with the slave initiator component when the request is issued, a functionality mode associated with the slave initiator component when the request is issued, information identifying the slave initiator component, and whether the request is a request to read data, to read an instruction, or to write data to the first target memory component.

4. The SOC of claim 1, wherein the at least one portion of the first target memory component is dedicated to a slave initiator component.

5. The SOC of claim 1, wherein the access conditions applicable to all slave initiator components in the first data structure and in the second data structure indicate separately for each security mode of a plurality of security modes whether data accesses and instruction executions can be performed using, respectively, the at least one portion of the first target memory component when the SOC is in that security mode and the at least one portion of the second target memory component when the SOC is in that security mode.

6. The SOC of claim 1, wherein the distinct access conditions for each slave initiator component in the first data structure and in the second data structure indicate whether that initiator component is permitted to read and write data to, respectively, the at least one portion of the first target memory component and the at least one portion of the second target memory component.

7. The SOC of claim 1, wherein each slave initiator firewall is configured to perform a protective action to prevent the corresponding slave initiator component from accessing the first target memory component or the second target memory component based on the programmed region permission check logic of the slave initiator firewall.

8. The SOC of claim 1, wherein the SOC is comprised in a mobile communication device.

9. A method for providing security in a system-on-chip (SOC) comprising a plurality of slave initiator components and a plurality of target memory components, the method comprising:
  programming, by a core processor in the SOC configured to operate as a master initiator, region permission check logic in a first target firewall coupled to a first target memory component according to a first data structure stored in a memory of the SOC, wherein the first data structure indicates, for at least one portion of the first target memory component, distinct access conditions for each slave initiator component and access conditions applicable to all slave initiator components;
  programming, by the core processor, region permission check logic in a second target firewall coupled to a second target memory component according to a second data structure stored in a memory of the SOC, wherein the second data structure indicates, for at least one portion of the second target memory component, distinct access conditions for each slave initiator component and access conditions applicable to all slave initiator components;
  programming, by the core processor, region permission check logic in a first slave initiator firewall coupled to a first slave initiator component and region permission check logic in a second slave initiator firewall coupled to a second slave initiator component according the distinct access conditions for each slave initiator component and access conditions applicable to all slave initiator components indicated in the first data structure and the distinct access conditions for each slave initiator component and access conditions applicable to all slave initiator components indicated in the second data structure.

10. The method of claim 9, wherein the at least one portion of the first target memory component is dedicated to a slave initiator component.

11. The method of claim 9, wherein the access conditions applicable to all slave initiator components in the first data structure and in the second data structure indicate separately for each security mode of a plurality of security modes whether data accesses and instruction executions can be performed using, respectively, the at least one portion of the first target memory component when the SOC is in that security mode and the at least one portion of the second target memory component when the SOC is in that security mode.

12. The method of claim 9, wherein the distinct access conditions for each slave initiator component in the first data structure and in the second data structure indicate whether that initiator component is permitted to read and write data to, respectively, the at least one portion of the first target memory component and the at least one portion of the second target memory component.

13. The method of claim 9, further comprising:
  receiving a signal by the first target firewall requesting access to the at least one portion of the first target memory component, the signal comprising qualifiers of a slave initiator component; and
  comparing, by the first target firewall, the qualifiers with the access conditions programmed into the first target firewall and, as a result of the comparison, preventing the requested access.

14. The method of claim 13, wherein the qualifiers comprise
  a security mode of the SOC,
  a functionality mode of the SOC,
  information identifying the slave initiator component, and
  an indication of whether the requested access comprises a data read, an instruction read, or a data write.

15. The method of claim 13, wherein preventing the requested access comprises resetting the SOC.

* * * * *